(12) United States Patent
Toullec et al.

(10) Patent No.: US 11,523,147 B2
(45) Date of Patent: Dec. 6, 2022

(54) METHOD AND SYSTEM FOR PROCESSING MULTIMEDIA CONTENT WITHIN A METROPOLITAN AREA NETWORK

(71) Applicant: ATEME, Velizy Villacoublay (FR)

(72) Inventors: Eric Toullec, Orgeres (FR); Jerome Vieron, Issy les Moulineaux (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/178,879

(22) Filed: Nov. 2, 2018

(65) Prior Publication Data
US 2019/0132616 A1    May 2, 2019

(30) Foreign Application Priority Data

Nov. 2, 2017   (FR) ...................................... 17 60337

(51) Int. Cl.
*H04N 7/18*        (2006.01)
*H04N 21/2225*     (2011.01)
(Continued)

(52) U.S. Cl.
CPC ......... *H04N 21/2225* (2013.01); *H04L 65/70* (2022.05); *H04L 65/765* (2022.05);
(Continued)

(58) Field of Classification Search
CPC ....... H04N 21/43615; H04N 21/43637; H04N 21/2143; H04N 21/42204;
(Continued)

(56) References Cited

U.S. PATENT DOCUMENTS 6,898,799 B1 * 5/2005 Jarman ............... H04N 21/4532
 725/25
10,798,145 B1 * 10/2020 Garney ............... H04N 21/2407
(Continued)

FOREIGN PATENT DOCUMENTS

EP   2 566 172 A1   3/2013
EP   2 661 045 A1   11/2013

OTHER PUBLICATIONS

Boszormenyi et al., "Metadata-driven optimal transcoding in a multimedia proxy," Multimedia Systems, Springer, Berlin, DE, Mar. 8, 2007, vol. 13(1), pp. 51-68.
(Continued)

*Primary Examiner* — Annan Q Shang
(74) *Attorney, Agent, or Firm* — Faegre Drinker Biddle & Reath LLP

(57) ABSTRACT

A method for processing a multimedia content previously digitally encoded into an audio-video stream and transmitted from a distribution platform for the purposes of on-demand transmission to a plurality of receiving terminals includes the following steps: applying a demultiplexing function to the audio-video stream, said function being arranged to generate at least one group of data streams; applying a transformation to each data stream; segmenting each data stream; storing the at least one group of segmented data streams in a memory; carrying out, only in response to a request issued by a receiving terminal among the plurality of receiving terminals, the following steps: selecting, on the basis of the request, at least one data stream of at least one group of stored data streams; and transmitting the at least one selected data stream to the receiving terminal that issued the request.

12 Claims, 4 Drawing Sheets

(51) Int. Cl.
*H04N 21/239* (2011.01)
*H04N 21/236* (2011.01)
*H04N 21/24* (2011.01)
*H04N 21/647* (2011.01)
*H04N 21/2343* (2011.01)
*H04L 65/80* (2022.01)
*H04N 21/222* (2011.01)
*H04N 21/2381* (2011.01)
*H04N 21/845* (2011.01)
*H04L 67/30* (2022.01)
*H04L 65/70* (2022.01)
*H04L 65/75* (2022.01)
*H04L 67/5682* (2022.01)
*H04N 21/434* (2011.01)

(52) U.S. Cl.
CPC .............. *H04L 65/80* (2013.01); *H04L 67/30* (2013.01); *H04L 67/5682* (2022.05); *H04N 21/222* (2013.01); *H04N 21/2343* (2013.01); *H04N 21/2381* (2013.01); *H04N 21/2393* (2013.01); *H04N 21/23439* (2013.01); *H04N 21/23608* (2013.01); *H04N 21/2402* (2013.01); *H04N 21/64738* (2013.01); *H04N 21/8456* (2013.01); *H04N 21/434* (2013.01)

(58) Field of Classification Search
CPC ......... H04N 21/43632; H04N 21/4622; H04N 21/64311; H04N 21/47202; H04N 21/84; H04N 21/2543; H04N 7/17318; H04N 7/10; H04N 7/104; H04N 7/106; H04N 7/163; H04N 7/18; H04N 7/20; H04N 7/108; H04N 7/147; H04N 7/183; H04N 7/17336; H04N 21/2225; H04N 21/2402; H04N 21/64738; H04N 21/2343; H04N 21/222; H04N 21/2381; H04N 21/23439; H04N 21/8456; H04N 21/2393; H04N 21/23608; H04N 21/434; H04L 65/605; H04L 65/80; H04L 67/2852; H04L 65/607; H04L 67/30
See application file for complete search history.

(56) References Cited

U.S. PATENT DOCUMENTS

| | | | | |
|---|---|---|---|---|
| 2002/0056123 A1* | 5/2002 | Liwerant | H04M 7/0039 | 725/87 |
| 2002/0194595 A1* | 12/2002 | Miller | H04N 21/235 | 725/36 |
| 2006/0224760 A1* | 10/2006 | Yu | H04L 67/108 | 709/231 |
| 2007/0079342 A1* | 4/2007 | Ellis | H04N 21/6336 | 725/89 |
| 2007/0294422 A1* | 12/2007 | Zuckerman | G06F 16/1834 | 709/230 |
| 2008/0189429 A1* | 8/2008 | DaCosta | H04L 65/80 | 709/231 |
| 2008/0195743 A1* | 8/2008 | Brueck | H04L 29/06027 | 709/231 |
| 2010/0094963 A1* | 4/2010 | Zuckerman | H04L 67/1097 | 709/219 |
| 2010/0272414 A1* | 10/2010 | Reneris | H04N 21/4583 | 386/291 |
| 2011/0082924 A1 | 4/2011 | Gopalakrishnan | | |
| 2011/0276710 A1* | 11/2011 | Mighani | H04N 21/44227 | 709/231 |
| 2012/0269263 A1* | 10/2012 | Bordes | H04N 19/129 | 375/E7.125 |
| 2013/0142479 A1* | 6/2013 | Wu | G02B 6/4201 | 385/14 |
| 2013/0254814 A1* | 9/2013 | Diaz Perez | H04N 21/2221 | 725/93 |
| 2014/0003501 A1* | 1/2014 | Soroushian | G06F 16/73 | 375/E7.243 |
| 2014/0003799 A1* | 1/2014 | Soroushian | H04N 9/8042 | 375/240.12 |
| 2014/0010282 A1* | 1/2014 | He | H04N 19/44 | 375/240.02 |
| 2014/0185670 A1* | 7/2014 | Wang | H04N 19/50 | 375/240.12 |
| 2014/0208374 A1* | 7/2014 | Delaunay | H04L 65/605 | 725/109 |
| 2014/0280764 A1 | 9/2014 | Dasher et al. | | |
| 2014/0355625 A1 | 12/2014 | Chen et al. | | |
| 2015/0208037 A1* | 7/2015 | Maurice | H04L 65/4046 | 348/14.09 |
| 2016/0286249 A1* | 9/2016 | Phillips | H04N 21/2385 | |
| 2018/0103199 A1* | 4/2018 | Hendry | H04N 21/21805 | |
| 2018/0167631 A1* | 6/2018 | Schulze | H04N 21/4302 | |
| 2018/0184156 A1* | 6/2018 | Major | H04N 21/44222 | |
| 2019/0007707 A1* | 1/2019 | Tsukagoshi | H04N 21/434 | |
| 2019/0037271 A1* | 1/2019 | Hernandez-Mondragon | H04N 21/8133 | |

OTHER PUBLICATIONS

Open IPTV Forum, "OIPF Release 2 Specification vol. 2a—HTTP Adaptive Streaming [V2.1]-[Jun. 21, 2011]," URL: <http://www.oipf.tv/docs/Release2/V2.1/OIPF-T1-R2-Specification-Volume-2a-HTTP-Adaptive-Streaming-V2_1-2011-06-21 pdf>; Jun. 21, 2011, 25 pages.

Search Report issued in related application FR 17 60337, dated Apr. 6, 2018, 9 pages.

* cited by examiner

TRAIT = PROCESS

EMISS = TRANSMIT

METHOD AND SYSTEM FOR PROCESSING MULTIMEDIA CONTENT WITHIN A METROPOLITAN AREA NETWORK

CROSS-REFERENCE TO RELATED APPLICATIONS

This application claims the benefit of French Application No. 17 60337 filed Nov. 2, 2017, the entire content of which is incorporated herein by reference.

FIELD

The field of the invention relates to methods and systems for processing multimedia content within a MAN (Metropolitan Area Network) type of network.

BACKGROUND

In recent years, the distribution of digital television has undergone multiple changes. New audiovisual services such as video-on-demand (VOD) or catch-up TV have developed and have led to the development of network infrastructures offering greater bandwidth to facilitate providing such services, in addition to traditional television distribution (broadcast).

These developments have led to the creation of a new type of services, called OTT (Over-The-Top) or bypass services, providing multi-screen delivery of multimedia content (video and audio in particular) over the Internet. The involvement of a traditional network operator in controlling the distribution of content is superfluous to the operation of OTT services. OTT services are provided through so-called unmanaged networks, meaning networks whose quality of service (QoS) or bandwidth varies for each customer and varies over time.

However, the network infrastructures supporting these OTT services reach their limits when the number of clients is too large. OTT service providers are therefore unable to control the quality of service experienced by the end user. OTT services are provided point-to-point, with each client having its own connection for downloading multimedia content. Also, as the number of clients increases, the bandwidth consumed also increases, which leads to overloading the upstream equipment of the OTT service providers and also to overloading the downstream distribution networks of the end user. This overload is exacerbated by the many media content distribution formats, which requires OTT service providers to maintain and manage multiple versions of the same content in different formats.

In addition, content providers have limited control over the load on distribution platforms. OTT protocols are centered on the client software. This software can therefore decide the bit rate it will request of the distribution platform without taking into account its capacities and limits, which can result in saturation of the distribution platform.

The present invention improves the situation.

SUMMARY

A method is proposed which is implemented by computer means, in a metropolitan area network (MAN), for processing a multimedia content previously digitally encoded into an audio-video stream and transmitted from a distribution platform for the purposes of on-demand transmission to a plurality of receiving terminals, the method comprising the following steps:

applying a demultiplexing function to the audio-video stream, said function being arranged to generate at least one group of data streams, applying a transformation to each data stream of the at least one group of data streams, segmenting each data stream of the at least one group of transformed data streams, storing the at least one group of segmented data streams in a memory, the method further comprising, only in response to a request issued by a receiving terminal among the plurality of receiving terminals, the following steps:

selecting, on the basis of the request, at least one data stream of at least one group of stored data streams, transmitting the at least one selected data stream to the receiving terminal that issued the request.

The proposed method allows the distribution of multimedia content to the receiving terminals, and in particular an OTT (Over-The-Top) distribution. This distribution is implemented in particular by the transformation and segmentation of data streams, which are then called profiles. The profiles are selected on the basis of the requests received, and are then transmitted to the receiving terminals. Implementation of the method within a metropolitan area network (MAN) makes it possible to reduce the load on the upstream network, meaning the network transporting the audio-video streams to the distribution platform, since this network is carrying a single audio-video stream for a given multimedia content.

According to one aspect, the demultiplexing function is adapted to generate a first group of video data streams, a second group of audio data streams, and a third group of text and/or closed-caption data streams.

The demultiplexing function makes it possible to break down the audio-video stream into video data streams, audio data streams, and text and/or closed-caption data streams, since these streams respectively require different processing and transformations.

According to one aspect, the method further comprises the following steps:

decoding the data streams of the at least one group of data streams, prior to the step of applying the transformation, encoding each data stream of the at least one group of data streams, consecutively to the step of applying the transformation.

When the conditions of the metropolitan area network allow, transcoding allows greater latitude in the transformation applied to the different data streams. Transcoding is understood to mean the combination of processes of decoding and subsequently encoding a data stream. Indeed, the transformation applied to decoded and therefore decompressed data streams is less restrictive than the transformation applied to data streams that are already encoded and therefore compressed.

According to one aspect, a manifest containing data representative of the segmented data streams is produced in parallel with or subsequent to the step of segmenting the data streams.

According to one aspect, at least a portion of the manifest produced is transmitted to at least a portion of the plurality of receiving terminals.

The manifest is a small document compared to the multimedia content it describes. Producing the manifest and providing it to the receiving terminals allows the receiving terminals to know the available profiles.

According to one aspect, the method further comprises the application of an additional transformation to at least one segmented data stream.

According to one aspect, the additional transformation includes filtering and/or compressing the at least one segmented data stream.

The application of an additional transformation to the segmented streams, meaning the profiles, makes it possible to adapt the profiles and therefore the manifest to the conditions of the metropolitan area network. For example, if the conditions of the network do not allow distribution of a produced profile, the additional transformation makes it possible to filter out this profile and therefore not distribute this profile to the receiving terminals. As a result, this profile is removed from the manifest, which is therefore updated, to avoid any request for distribution of the profile in question.

According to one aspect, the step of segmenting the data streams is implemented according to an HTTP Adaptive Streaming type of protocol.

Segmentation of the data streams according to an HTTP Adaptative Streaming (HAS) protocol allows an OTT distribution according to HAS standards and also allows producing multiple versions of the same profile according to the segmentation protocols used. This diversity of HAS protocols makes it possible to adapt to the various receiving terminals and thus to ensure multi-screen availability.

According to one aspect, the at least one selected data stream is transmitted to the receiving terminal via a server of the metropolitan area network (MAN), the server being remote from the distribution platform and from the plurality of receiving terminals, and coupled to a memory, the memory being suitable for temporarily storing the at least one transmitted data stream.

According to one aspect, the at least one selected data stream is transmitted to the receiving terminal via a server of the metropolitan area network (MAN), the server being remote from the distribution platform and from the plurality of receiving terminals, and coupled to a memory, the memory being suitable for temporarily storing the at least one transmitted data stream, the retention period for the at least one data stream stored in the memory being a function of the protocol.

According to one aspect, in response to a request subsequent to the first and issued by a second receiving terminal among the plurality of receiving terminals, at least one data stream stored in the memory is transmitted to said second receiving terminal.

The server of the metropolitan area network makes it possible to store the different profiles requested by the receiving terminals. Thus, if a receiving terminal transmits a request to distribute a profile already stored in the memory of the server, the server can transmit the requested profile to the receiving terminal. In particular, the higher the probability of a profile being requested again, the longer the retention period.

The invention further relates to a computer program comprising instructions for implementing the method, when the instructions are executed by at least one processor.

The invention finally relates to a system for processing, in a metropolitan area network (MAN), a multimedia content previously digitally encoded into an audio-video stream and transmitted to the system from a distribution platform, for the purposes of on-demand transmission to a plurality of receiving terminals, the system comprising:

a demultiplexing module arranged to apply a demultiplexing function to the audio-video stream received and to generate at least one group of data streams, a processing unit arranged to apply a transformation to each data stream of the at least one group of data streams, a packager arranged to segment each data stream of the at least one group of transformed data streams, a memory, coupled to the packager, adapted to store the at least one group of segmented data streams, a communication module arranged to receive requests issued by receiving terminals, the packager being further arranged to select, only upon receipt by the communication module of a request issued by a receiving terminal among the plurality of receiving terminals, on the basis of the request, at least one data stream from at least one group of stored data streams.

As explained above with reference to the method, the proposed system is located within the metropolitan area network (MAN), therefore closer to the receiving terminals. The location of the proposed system reduces the load on the upstream network transporting the audio-video streams to the distribution platform.

According to one aspect, the distribution platform forms a gateway between a wide area network (WAN) and the metropolitan area network (MAN).

According to one aspect, the system further comprises:

a decoding module arranged to decode the data streams of the at least one group of data streams output from the demultiplexing module, an encoding module adapted to encode each data stream of the at least one group of data streams output from the processing unit.

According to one aspect, the processing unit or an additional processing unit of the system is arranged to apply an additional transformation to at least one segmented data stream.

According to one aspect, the processing unit or the additional processing unit is adapted to filter and/or compress the at least one segmented data stream.

The processing unit or the additional processing unit located in the system allows content providers to have more control over the distribution of multimedia content and to modify or delete profiles that do not meet the conditions of the metropolitan area network.

BRIEF DESCRIPTION OF THE DRAWINGS

Other features, details and advantages of the invention will be apparent from reading the following detailed description, and from an analysis of the appended drawings, in which.

DETAILED DESCRIPTION

In the following, multimedia content is encoded into an audio-video stream to enable transport of the content, for example in a manner known per se. "Stream storage" is mentioned. The reader will understand that this concerns the storing of data pulled from a stream. Unless otherwise stated, data pulled from a stream is stored without prior decoding, in particular for the purpose of being retransported.

Figure 1:
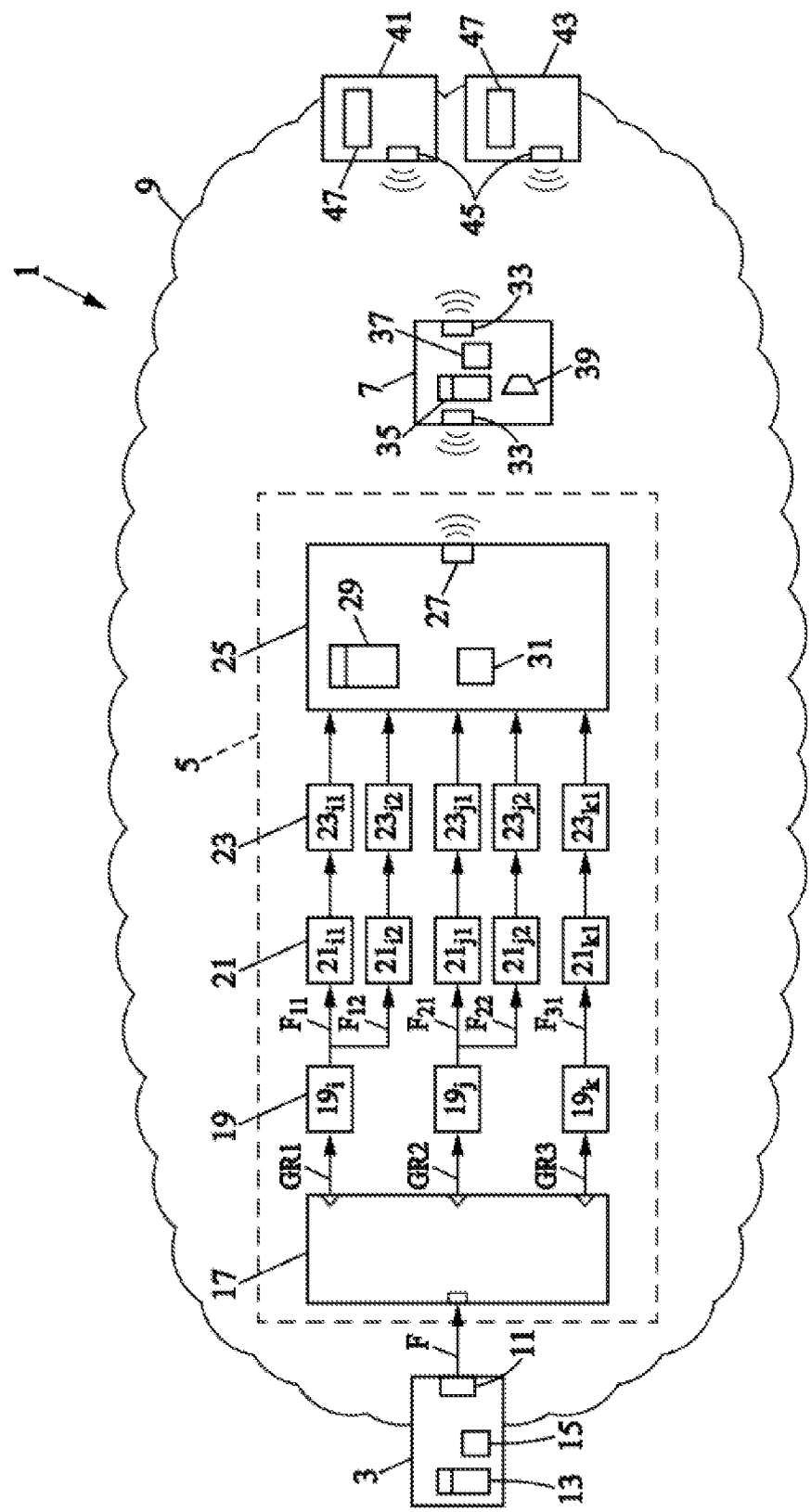
FIG. 1 illustrates an assembly comprising a distribution platform, a system according to a first embodiment of the invention, a remote server, and a plurality of receiving terminals.
Figure 2:
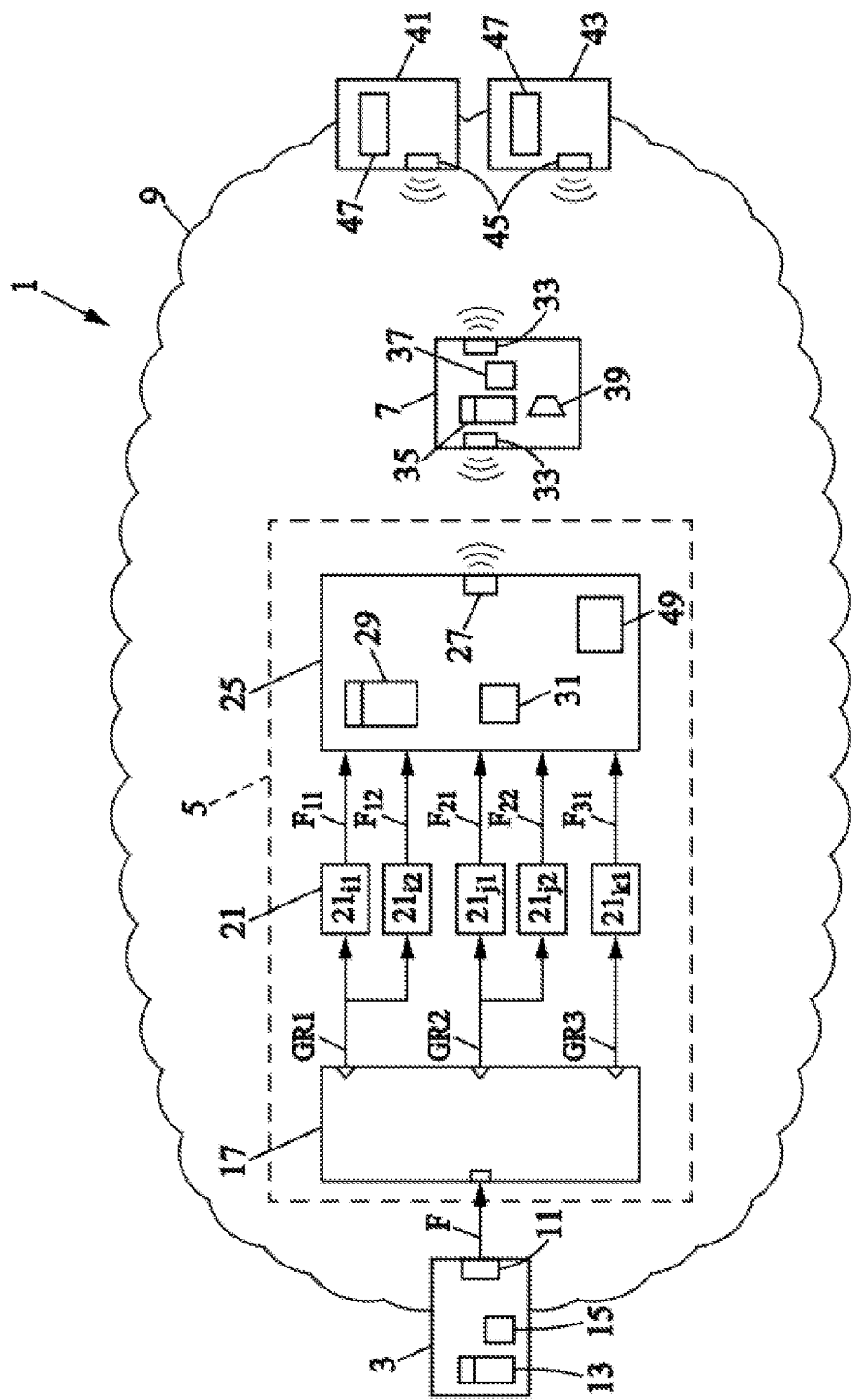
FIG. 2 illustrates the assembly of FIG. 1, comprising a system according to a second embodiment of the invention.

FIGS. 1 and 2 illustrate an assembly 1. The assembly 1 comprises a distribution platform 3, a system 5, a remote server 7, and a plurality of receiving terminals 41, 43. The assembly 1 is located in a metropolitan area network 9, known by the acronym MAN. The network 9 here is defined by the IEEE 802.2001 standard: "*IEEE Standard for Local and Metropolitan Area Networks: Overview and Architecture, Mar. 8, 2002.*"

The distribution platform 3 is arranged to transmit an audio-video stream F corresponding to a multimedia content, to the system 5. The distribution platform 3 is for example known by the acronym CDN (Content Delivery Network). In the context of the invention, the distribution platform 3 is arranged to implement an OTT (Over-The-Top) distribution. It is therefore understood that the metropolitan area network 9 is typically an unmanaged network, meaning a network whose quality of service (QoS) or bandwidth varies for each customer and varies over time. Typically, the audio-video stream F comes from a headend of a wide area network, known by the acronym WAN, for example the Internet. Advantageously, the distribution platform 3 forms a gateway between the wide area network and the metropolitan area network 9.

The context of the invention therefore relates to the OTT distribution. However, the distribution platform 3 and the system 5 are further arranged to implement at least in part the wide distribution or traditional television broadcast distribution.

Multimedia content here refers to video and/or audio content. In the example described here, the multimedia content further comprises text content such as closed-captions. Such content is intended to be delivered to at least one receiving terminal among the plurality of receiving terminals in order to make the multimedia content accessible to a user of the receiving terminal. Delivery of the multimedia content to the receiving terminal requires digital processing of the content. Here, the multimedia content is digitally encoded beforehand into an audio-video stream F able to undergo the processing described hereinafter. It is understood that the multimedia content is digitally encoded upstream of the distribution platform 3, in the wide area network, before being transmitted to the distribution platform 3. For example, the audio-video stream F is digitally encoded in the network headend. Then digital processing is applied to the encoded audio-video stream F. The digital processing is performed by a device in the metropolitan area network 9, for example the distribution platform 3 itself or another device.

The distribution platform 3 comprises a communication module 11, a memory 13, and a processor 15.

The communication module 11 is configured to receive the audio-video stream F, for example via the upstream wide area network. The communication module 11 is further arranged to transmit the audio-video stream F to the assembly 5 downstream. A distribution platform 3 may be connected to a plurality of networks such as the metropolitan area network 9.

The memory 13 is adapted to temporarily store the audio-video stream F received. In the example described here, a single audio-video stream F corresponding to multimedia content is stored. However, the memory 13 is suitable for temporarily storing multiple audio-video streams. The memory 13 is for example a cache memory. In addition, the memory 13 stores a computer program which when executed by the processor 15 results in the operation of the distribution platform 3. Advantageously, the memory 13 comprises an address of the assembly 5 and/or the respective addresses of the receiving terminals of the plurality of receiving terminals in order to route the audio-video stream F to the corresponding assembly 5.

It will be understood here that the demands placed on the storage capacities of the distribution platform 3 are small in comparison to headends storing all streams received. Indeed, for a given multimedia content, only one audio-video stream F is stored, and this is only temporary.

In a first embodiment, illustrated in FIG. 1, the system 5 comprises a demultiplexing module 17, at least one decoding module 19, here three decoding modules 19, at least one first processing unit 21, here five first processing units 21, at least one encoding module 23, here five encoding modules 23, and a packager 25. Advantageously, the system 5 and its components are physically grouped and are preferably close to or within the geographical area corresponding to the metropolitan area network 9. The system 5 is, for example, located in a point of presence, known by the acronym PoP.

The demultiplexing module 17 is arranged to apply a demultiplexing function to the audio-video stream F received from the distribution platform 3 via its communication module 11. The demultiplexing function makes it possible to generate a plurality of groups of data streams, pulled from the audio-video stream. For example, the plurality of groups of data streams comprises at least a first group GR1 of video data streams, a second group GR2 of audio data streams, and a third group GR3 of text and/or closed-caption data streams.

Each group of data streams comprises at least one data stream. In the example illustrated in FIG. 1, the first group GR1 of video data streams comprises a first $F_{11}$ and a second $F_{12}$ video data stream. The second group GR2 of audio data streams comprises a first $F_{21}$ and a second $F_{22}$ audio data stream. The third group GR3 of closed caption data streams here comprises a single stream $F_{31}$ of closed-caption data. At the output of the demultiplexing module 17, all data streams in a group of data streams are identical. In the example described here, the output of the demultiplexing module 17 is therefore:

$F_{11}=F_{12}$
$F_{21}=F_{22}$

As explained above, the audio-video stream F is a digitally encoded stream. "Digitally encoded" is understood here to mean that the audio-video stream F is a stream compressed according to a given compression standard. Therefore, the data streams in each group of data streams are also streams compressed according to this same compression standard.

Each decoding module 19 is arranged to digitally decode the data streams of a group of data streams output from the demultiplexing module 17. A decoding module 19 is respectively associated with each of the groups of data streams. In the example described here, a decoding module $19_i$ is adapted to decode the video data streams of the first group GR1, a decoding module $19_j$ is adapted to decode the audio data streams of the second group GR2, and a decoding module $19_k$ is adapted to decode the closed-caption data stream of the third group GR3.

The same digital decoding is applied to each data stream in a same group of data streams.

"Digital decoding" is understood here to mean that each data stream in a group of data streams is a full baseband stream when output from the associated decoding module 19.

The first processing unit 21, hereinafter the processing unit 21, is adapted to apply a first transformation TR1 to each data stream output from the decoding module 19. More specifically, a processing unit 21 is respectively associated with each data stream output from the associated decoding module 19. In the example described here, a processing unit $21_{i1}$ is suitable for applying a first transformation TR1 to the first video data stream $F_{11}$, and a processing unit $21_{i2}$ is suitable for applying a first transformation TR1 to the second video data stream $F_{12}$. Similarly, a processing unit $21_{j1}$ is suitable for applying a first transformation TR1 to the first audio data stream $F_{21}$, and a processing unit $21_{j2}$ is suitable for applying a first transformation TR1 to the second audio data stream $F_{22}$. Finally, a processing unit $21_{k1}$ is suitable for applying a first transformation TR1 to the closed-caption data stream $F_{31}$.

In the example described here, different digital processing is applied to each data stream. The data streams of the same group of data streams can therefore be different from each other when output from the processing unit 21. For example, for a same group, data streams of different sizes can be obtained by adjusting the quality of the multimedia content during processing.

"Digital processing" is understood here to mean that the first transformation TR1 applied to a data stream output from the decoding module 19 is an operation or a set of operations among at least the following operations: changing the number of frames per second, resizing, reducing noise, smoothing or correcting errors present in the stream. The first transformation TR1 can obviously indicate other types of known operations applicable to a data stream in the field of digital processing.

The encoding module 23 is arranged to digitally encode each data stream output from the processing unit 21. More specifically, a respective encoding module 23 is respectively associated with each data stream output from the associated processing unit 21. In the example described here, an encoding module $23_{i1}$ is adapted to encode the first video data stream $F_{11}$, and an encoding module $23_{i2}$ is adapted to encode the second video data stream $F_{12}$. Similarly, an encoding module $23_{j1}$ is adapted to encode the first audio data stream $F_{21}$, and an encoding module $23_{j2}$ is adapted to encode the second audio data stream $F_{22}$. Finally, an encoding module $23_{k1}$ is adapted to encode the closed-caption data stream $F_{31}$.

Advantageously, a different digital encoding method is applied to each data stream.

As previously explained, each data stream in a group of data streams output from the associated decoding module 19 is a full baseband stream. "Digital encoding" is understood here to mean that each decoded and transformed data stream is compressed according to a given compression standard.

When output from the encoding module 23, the data streams in a same group of data streams have been successively decoded according to a same decoding process, then a first specific transformation TR1 is applied to each of them, and finally a specific encoding process. Below, the combination of the processes of decoding then later encoding a data stream will be called transcoding. The embodiment illustrated in FIG. 1 is thus an embodiment enabling the implementation of a transcoding process.

The different data streams, encoded and transformed, of the same group of data streams are called profiles in the following description.

In the example described here, the first group GR1 of video data streams comprises a first video profile $F_{11}$ and a second video profile $F_{12}$. The second group GR2 of audio data streams comprises a first audio profile $F_{21}$ and a second audio profile $F_{22}$. Finally, the third group GR3 of closed-caption data streams comprises a closed-caption profile $F_{31}$.

The profiles of a group of data streams correspond to different versions of the same initial multimedia content. Thus, the first group GR1 comprises one or more versions, here two profiles and therefore two versions, of the same video content, the second group GR2 comprises one or more versions, here two profiles and therefore two versions, of the same audio content, and the third group GR3 comprises one or more versions, here one profile and therefore one version, of a closed-caption content. The existence of different profiles makes it possible to adapt to the inherent capacities and characteristics of each receiving terminal among the plurality of receiving terminals. For example and without limitation, the different video profiles are distinguished by the number of frames per second, the resolution, the compression standard, and/or the definition. For example and without limitation, the different audio profiles are distinguished for example by the number of tracks, the compression standard, and/or the number of frames per second. For example and without limitation, the different closed-caption profiles are distinguished by the language and/or the type of closed-caption (voice captioning only or complete closed-caption for the hearing impaired).

The packager 25 is arranged to segment each data stream, and therefore each profile, of at least one group of data streams, into a plurality of segments. The segmentation of profiles is implemented according to an *HTTP Adaptive Streaming* type of protocol (known by the acronym "HAS"). Profile segmentation is therefore performed in formats enabling OTT distribution according to HAS standards. For example, the protocol for segmenting the plurality of segments is a protocol such as MP4, MPEG2-TS, or any other known protocol. Advantageously, the same profile is segmented according to multiple protocols. It is understood here that several versions of the same profile are produced, each version being characterized at least by the segmentation protocol applied to the profile. It is therefore understood here that the packager 25 is arranged to implement an OTT distribution, at least in part. However, as explained above, the packager 25 is further arranged to enable broadcasting, at least in part.

In parallel with or subsequent to the segmentation of the data streams, and therefore of the profiles, the packager 25 is arranged to produce a manifest. The manifest is a document containing information about the characteristics of each profile and of associated segments. The manifest here is defined by the ISO/IEC 23009 standard. More specifically, the manifest comprises data representative of the segmented data streams, and thus of the profiles obtained. More specifically, it is understood here that, for a profile obtained and indicated in the manifest, data representative of the profile in question are included in the manifest produced. For example, for a profile given and indicated in the manifest produced, the data representative of the profile in question comprise data representative of the profile segmentation protocol. The data representative of the profile in question may comprise data representative of the size of the segments obtained. Typically, the manifest is produced in an XML format. The manifest is a small document compared to the media content it describes. It can therefore be widely distributed without having a significant negative impact on the network load. The manifest is made available and accessible to the receiving terminals. It is therefore understood that at least a portion of the manifest is transmitted to at least a portion of the receiving terminals. In addition, the manifest may be updated within the packager. Updating the manifest is for example dependent on the conditions of the metropolitan area network 9. It is understood here that it is possible that the conditions of the metropolitan area network 9 temporarily do not allow distribution of a profile even if this profile was able to be generated and segmented. In such a case, this profile may for example be filtered from the manifest. In other words, the data representative of the profile in question are removed from the manifest. The filtered profile can therefore no longer be requested by a receiving terminal. The updated manifest is then made available to the receiving terminals in place of the previous manifest. As long as the conditions of the metropolitan area network 9 do not allow distribution of a profile, a user cannot request the distribution of the profile in question, as said profile is not indicated in the manifest.

The packager 25 is further arranged to select, upon receiving a request issued by a receiving terminal among the plurality of receiving terminals, at least one data stream of at least one group of segmented data streams, on the basis of the request received. The packager 25 is further arranged to transmit the at least one selected data stream to the receiving terminal where the request originated, via the remote server 7. In the context of the invention, a receiving terminal transmits a request to the packager 25 in order to access a multimedia content via the distribution of one or more profiles corresponding to this multimedia content. As previously explained, the profiles accessible to a receiving terminal are indicated in the manifest accessible to the receiving terminal. Typically, in order to access a given multimedia content, a receiving terminal sends a request for the distribution of a video profile, an audio profile, and a text and/or closed-caption profile. The available profiles are the profiles indicated in the manifest. Distribution of the profiles requested in the request constitutes on-demand distribution.

The packager 25 comprises a communication module 27, a memory 29, and a processor 31.

The communication module 27 is arranged to receive the request sent by a receiving terminal among the plurality of receiving terminals, via the remote server 7. The communication module 27 is arranged to receive the different profiles of each group of data streams output from the encoding module 23. The communication module 27 is further arranged to send the segmented profiles to the receiving terminal, via the remote server 7.

The memory 29 is able to temporarily store the different profiles of each group output from the encoding module 23. The memory 29 includes for example a cache memory. In addition, the memory 29 stores a computer program which when executed by the processor 31 results in the operation of the packager 25. Advantageously, the memory 29 comprises the respective addresses of the receiving terminals of the plurality of receiving terminals, for routing the segmented profiles to the receiving terminals.

In one embodiment, the packager 25 is arranged to encrypt the segments and/or the manifest transmitted to the remote server.

The remote server 7 is adapted to transmit segments or segmented profiles received from the packager 25, to a receiving terminal among the plurality of receiving terminals. It is understood here that the remote server 7 is adapted to allow the plurality of receiving terminals to access the segmented profiles transmitted.

The remote server 7 comprises a communication module 33, a memory 35, and a processor 37.

The communication module 33 is configured to receive the segments or segmented profiles sent by the packager 25. The communication module 33 is configured to transmit a request received from a receiving terminal, to the packager 25.

The memory 35 is arranged to temporarily store the segments or segmented profiles received. The memory 35 includes, for example, a cache memory. Advantageously, the retention period for a profile or a segment in the memory 35 is determined as a function of the segmentation protocol. The more likely a segmentation profile is to be requested by users via requests, the longer the resulting profile or segment is kept in the memory 35. It will be understood that a probability is associated, in the remote server 7, with a segmented profile stored in the memory 35. This probability corresponds to the probability that this profile will be requested again by another receiving terminal. This probability is for example determined as a function of the segmentation protocol of the segmented profile in question. Thus, in response to a subsequent request from a second receiving terminal among the plurality of receiving terminals, the remote server 7 is arranged to transmit a segment or segmented profile stored in the memory 35 to the second receiving terminal. Frequently used segments or segmented profiles remain available in the memory 35, while rarely requested segments or segmented profiles are ultimately removed from the memory 35.

In addition, the memory 35 stores a computer program which when executed by the processor 37 results in the operation of the remote server 7.

As previously explained, the distribution of the segmented profiles is implemented according to HAS standards in the context of an OTT distribution. However, and as previously stated, the system 5 is further arranged to implement at least in part the wide distribution or traditional television broadcast distribution in one or more embodiments. In order to broadcast multimedia content, the remote server 7 comprises, in one or more embodiments, a multiplexing module 39.

The multiplexing module 39 is arranged to generate multimedia content including video, audio, and text and/or closed-captioning. Similarly to OTT distribution, the content generated by the multiplexing module 39 is transmitted to a receiving terminal among the plurality of receiving terminals via the communication module 33.

In a broadcast, the streams are sent out over the network without being requested. Conversely, in OTT distribution, streams are made available to the receiving terminals and are distributed only when requests are received from the receiving terminals. As explained above, the system 5 and the server 7 are arranged to allow both OTT distribution and broadcast distribution.

In the example illustrated in FIG. 1, the plurality of receiving terminals comprises a first receiving terminal 41 and a second receiving terminal 43. The receiving terminals 41, 43 are able to receive segments or segmented profiles coming from the packager 25 via the remote server 7. The receiving terminals 41, 43 are further arranged to generate, from the segments or segmented profiles received, the multimedia content which the user wishes to access. Alternatively, the requested multimedia content is generated at the remote server 7 and then is transmitted to the receiving terminals.

The first and second receiving terminals 41, 43 each comprise a communication module 45 and a screen 47. For example, the first receiving terminal 41 is a computer and the second receiving terminal 43 is a television.

The communication module 45 is configured to receive the multimedia content transmitted by the remote server 7. The communication module 45 is further adapted to issue a request to the remote server 7.

The screen 47 is adapted to show at least part of the multimedia content received by the communication module 45.

The first 41 and second 43 receiving terminals are arranged to generate requests for sending to the remote server 7. The requests may contain a combination of parameters determined automatically, for example a quality level of the multimedia content depending on the quality of the connection, and parameters selected by the user, for example via a human-machine interface. These parameters are, for example and without limitation, the bit rate, the resolution, the definition of the image, or the presence or absence of closed-captions.

FIG. 2 illustrates the system 5 according to a second embodiment. This second embodiment differs from the first embodiment described above in that it lacks a module for transcoding. In other words, the system 5 of this second embodiment does not include a decoding module 19 or an encoding module 23.

Thus, the processing unit 21 is arranged to apply a first transformation TR1 to each already encoded data stream. In the context of this second embodiment, the different profiles of each group of data streams correspond to the different previously encoded and then transformed data streams from each group of data streams.

As explained above, this second embodiment is implemented without transcoding. The first transformation TR1 of this second embodiment is therefore applied to already-compressed data streams. Conversely, the first transformation TR1 of the first embodiment described above with reference to FIG. 1 is applied to decoded and therefore decompressed data streams. The first transformation TR1 applied to already-compressed data streams is more restrictive than the first transformation TR1 applied to uncompressed data streams. It is therefore understood that only a part of the operations applicable to uncompressed data streams is applicable to compressed data streams.

The second embodiment is further distinguished from the first embodiment by the presence of a second processing unit 49, hereinafter processing unit 49.

Processing unit 49 is included in the packager 25. Alternatively, the second processing unit 49 is applied to the output from processing unit 21.

Processing unit 49 is arranged to apply an additional transformation TR2, hereinafter the second transformation TR2, to at least one segmented profile. The second transformation TR2 includes, for example, filtering and/or compression of at least one data stream. Alternatively, the distinction between processing unit 21 and processing unit 49 is only functional: the two types of processing can be implemented at least in part by the same computing device.

In the example described, processing unit 19 and processing unit 49 are two processing units respectively implementing the first transformation TR1 and the second transformation TR2. Alternatively, processing unit 19 and processing unit 49 are the same processing unit arranged to apply the first transformation TR1 and the second transformation TR2.

Figure 3:
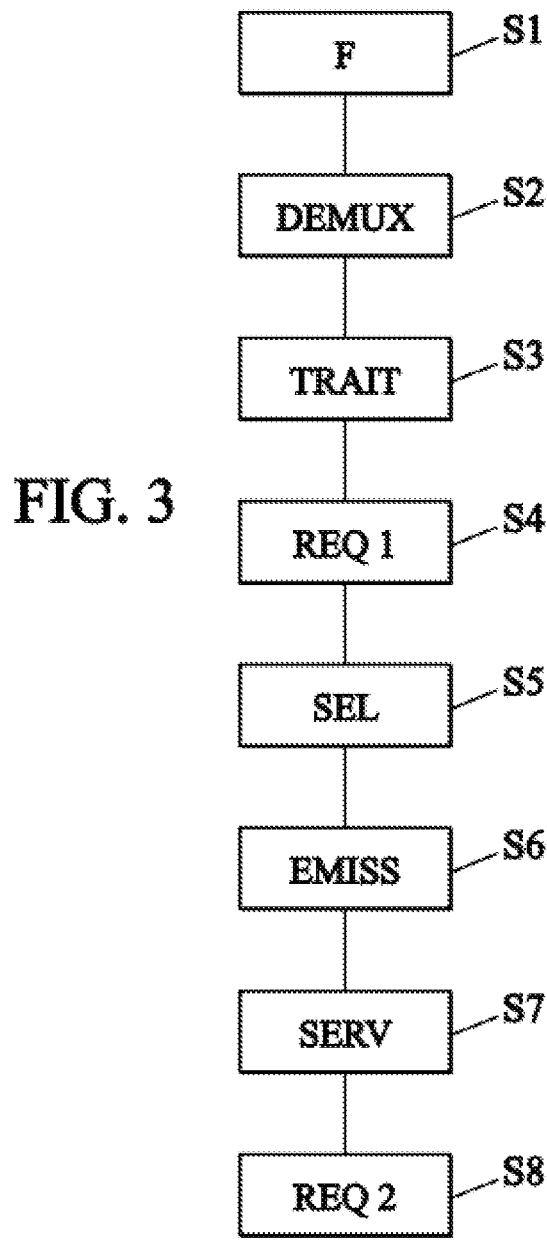
FIG. 3 illustrates a method for processing multimedia content according to the invention.

A method for processing the multimedia content in the metropolitan area network 9 is described below with reference to FIG. 3. The multimedia content is distributed as part of an OTT distribution. Typically, the metropolitan area network 9 is what is called an unmanaged network, meaning networks in which the quality of service (QoS) or bandwidth varies for each customer and varies over time.

In a first step S1, the distribution platform 3 receives a multimedia content, previously digitally encoded into an audio-video stream F. For example, the multimedia content has been digitally encoded by the headend in a wide area network, and the resulting audio-video stream F has been transmitted to the distribution platform 3. In one embodiment, the distribution platform 3 acts as a gateway between the wide area network and the metropolitan area network (MAN). At the end of this first step S1, the audio-video stream F is transmitted by the communication module 11 of the distribution platform 3 to the system 5. As explained above, the system 5 is typically located in a point of presence, or PoP. In particular in the example described here, the audio-video stream F is transmitted by the communication module 11 to the demultiplexing module 17.

In a second step S2, the demultiplexing module 17 applies a demultiplexing function to the audio-video stream F. This demultiplexing function generates at least one group of data streams. In the example described in FIG. 1, the demultiplexing function generates a first group GR1 of video data streams, a second group GR2 of audio data streams, and a third group GR3 of text and/or closed-caption data streams. The first group GR1 of video data streams comprises a first $F_{11}$ and a second $F_{12}$ video data streams. The second group GR2 of audio data streams comprises a first $F_{21}$ and a second $F_{22}$ audio data streams. Finally, the third group GR3 of closed-caption data streams comprises a closed-caption data stream $F_{31}$.

A third step S3 comprises the digital processing of the data streams in the groups of data streams. The third step S3 includes the generation and processing of the different profiles for each group of data streams. The profiles obtained are then segmented within the packager 25, then stored in the memory 29 of the packager 25. The third step S3 further includes the generation of a manifest. As explained above, the manifest is a document made accessible to the receiving terminals, and contains information relating to the characteristics of each profile and of the associated segments. The manifest more particularly includes data representative of the segmented data streams, and therefore of the profiles obtained. For example, for a profile given and indicated in the manifest, the representative data of the profile in question comprise data representative of the profile segmentation protocol. The data representative of the profile in question may comprise data representative of the size of the segments obtained. The manifest allows the receiving terminals to determine which profiles are available. A first and a second embodiment of this third step S3 will be described in detail hereinafter. As explained below, this step S3 is in fact a succession of steps which differ according to the embodiment. At the end of this third step S3, profiles are selected by the packager 25 for distribution to at least one receiving terminal.

In a fourth step S4, the packager 25 receives a request from a receiving terminal among the plurality of receiving terminals. For example, the request is sent by the first receiving terminal 41. The request comprises data representative of the choice of profiles that the user of the receiving terminal wishes to receive. As previously explained, the available profiles are specified in the manifest made accessible to the receiving terminal. The user can thus choose among the available profiles, using an interface of the receiving terminal. The profiles requested via the request are therefore, by necessity, profiles entered in the manifest. In the example described here, several video profiles corresponding to a same multimedia content are available. Likewise, several audio profiles corresponding to a same multimedia content are available. Finally, several text and/or closed-caption profiles corresponding to a same multimedia content are available. In addition, and as explained above, each profile can be segmented in the memory 29 of the packager 25 according to different HTTP Adaptive Streaming protocols. Thus, several versions of the same profile are stored in the memory 29, each version corresponding to a segmentation protocol. The request may further comprise addressing information such as the address of the receiving terminal, and optionally any other information useful for routing the requested segmented profile(s) to the terminal via the remote server 7.

In a fifth step S5, the packager 25 selects at least one profile on the basis of the received request. Advantageously, the packager 25 selects at least one profile per group of data streams, in other words per group of profiles. For example, the packager may select the first video profile $F_{11}$, the second audio profile $F_{22}$, and the text and/or closed-caption profile $F_{31}$. The selection of at least one profile per group of profiles enables generation of multimedia content comprising a video content, an audio content, and a text and/or closed-caption content.

In a sixth step S6, the communication module 27 of the packager 25 transmits the selected profiles to the remote server 7 for OTT distribution to the receiving terminal where the processed request originated. The packager may also transmit a manifest produced or a manifest updated by the packager, to the remote server 7, in order to make the manifest accessible to the receiving terminals and thus inform the respective users of the receiving terminals of the available profiles and protocols.

In a seventh step S7, the communication module 33 of the remote server 7 receives the segmented profiles transmitted by the packager 25. The segmented profile or profiles are temporarily stored in the memory 35. As explained above, the retention period of a segment or segmented profile depends on the probability that the segment or segmented profile in question will again be requested by another receiving terminal. In other words, the greater the likelihood that a segmented profile or a segment will be the subject of a request sent by a receiving terminal, the longer the retention period of this segmented profile or segment. Typically, this retention period is a function of the segmentation protocol of the profile considered. It is understood here that some segmentation protocols may be more in demand than others. In one embodiment, the requested multimedia content is generated at the remote server, for example by the processor 31, from the segmented profiles received, in accordance with the request. But as explained above, in another embodiment the multimedia content may be generated at the receiving terminals, the remote server 7 simply relaying the segmented profiles or segments.

For example, in an eighth step S8, a new request is sent by a receiving terminal among the plurality of receiving terminals. For example, the second receiving terminal 43 sends a request, via the communication module 45, to the remote server 7 in order to access an identified multimedia content. If this new request is similar to the previously processed request and the requested segmented profiles or segments are still stored in the memory 35, the server 7 transmits the requested multimedia content without having to send the request to the packager 25.

Figure 4:
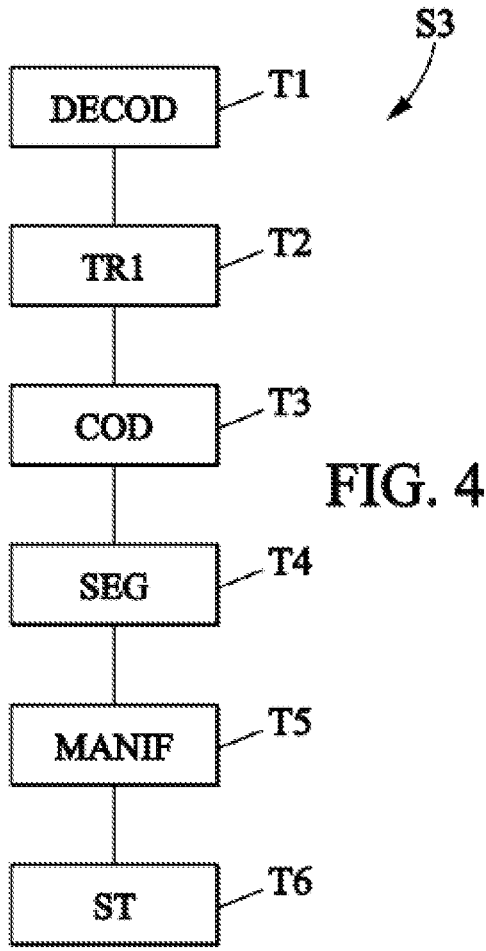
FIG. 4 illustrates one step of the method of FIG. 3 according to a first embodiment of the invention.

With reference to FIG. 4, the third step S3 will be described according to a first embodiment of the method. This embodiment is implemented by the assembly 1 illustrated in FIG. 1. Such an embodiment is, for example, implemented when transcoding is possible at the level of the metropolitan area network 9.

In a first step T1, the data streams of each group of data streams are digitally decoded by the decoding module 19 at the output from the demultiplexing module 17. As previously explained, a decoding module 19 is respectively associated with each group of data streams. In the example described here, a decoding module is adapted to decode the video data streams of the first group GR1, a decoding module is adapted to decode the audio data streams of the second group GR2, and a decoding module is adapted to decode the closed-caption data streams of the third group GR3.

As previously explained, "digital decoding" is understood to mean that each data stream in a group of data streams is a full baseband stream when output from the associated decoding module 19.

In a second step T2, a first transformation TR1 is applied by the first processing unit 21, hereinafter processing unit 21, to each data stream output from the decoding module 19. As explained above, a processing unit 21 is assigned to each of the data streams.

As previously explained, "digital processing" is understood to mean that the first transformation TR1 applied to a data stream output from the decoding module 19 is an operation or a set of operations among the following operations: changing the number of frames per second, resizing, reducing noise, smoothing or correcting errors present in the stream. The first transformation TR1 can indicate other types of known operations applicable to a data stream.

In a third step T3, each data stream is digitally encoded at the output of processing unit 21, by an encoding module 23. As previously explained, a respective encoding module 23 is associated with each of the data streams. The different data streams output from the encoding modules 23 constitute different profiles.

As previously explained, "digital encoding" is understood to mean that each decoded and transformed data stream is compressed according to a given standard.

The different profiles of a same group of data streams correspond to different versions of a same multimedia content. In the example described here, the first group GR1 comprises two profiles, and therefore two versions, of a same video content. The second group GR2 comprises two profiles of a same audio content. The third group GR3 contains a single profile of a closed-caption content.

In a fourth step T4, the obtained profiles are respectively segmented into a plurality of segments. Each segment corresponds to a temporal fragment of the multimedia content. Typically, a segment corresponds to a few seconds of the multimedia content. As previously explained, segmentation of the profiles is implemented according to an HTTP Adaptive Streaming type of protocol. For example, the segmentation protocol for the plurality of segments is a MP4 or MPEG2-TS protocol. The same profile is segmented according to multiple protocols. Thus, several versions of the same profile are produced, each version being characterized by at least the segmentation protocol applied to the profile.

In a fifth step T5, in parallel with or subsequent to step T4, the packager 25 generates a manifest. As previously explained, the manifest is a document containing information about the characteristics of each profile and of the associated segments. The manifest includes data representative of the segmented data streams, in other words the profiles obtained. It is understood here that, for a profile obtained and indicated in the manifest, data representative of the profile in question are included in the manifest produced. For example, for a profile given and indicated in the manifest, the data representative of the profile in question comprise data representative of the profile segmentation protocol. The data representative of the profile in question may comprise data representative of the size of the segments obtained. Typically, the manifest is produced in an XML format. The manifest is intended to be made available and accessible to the receiving terminals. In addition, the manifest may be updated within the packager, independently of the profiles. Updating the manifest is for example dependent on the parameters of the metropolitan area network 9. For example, the parameters of a metropolitan area network 9 may not allow, possibly temporarily, the distribution of a profile even if this profile was previously able to be generated and segmented. In such a case, the data relating to this profile may, for example, be deleted from the manifest. The updated manifest is then made available to the receiving terminals in place of the previous manifest. As long as the conditions of the metropolitan area network 9 do not allow distribution of a profile, a user cannot request the distribution of the profile in question, as said profile is not indicated in the manifest, and this is independent of the actual availability of the profile upstream of the metropolitan area network 9.

In a sixth step T6, the segmented profiles obtained are stored in the memory 29 of the packager 25.

Steps T1, T2, T3, T4, T5 and T6 of this first embodiment are here called "steps" but can also be considered as substeps of step S3. As explained above, the execution of steps T1, T2, T3, T4, T5 and T6 is one embodiment of the execution of step S3. In the embodiment of the method described with reference to FIG. 4, the segmentation of profiles according to different protocols precedes the receiving of a request. However, technologies for real-time delivery, referred to as Just in Time (JIT), make it possible to segment the profiles received by the packager 25 upon receiving the request and based on the request. As a variant, a profile is segmented in advance of or upon receiving a first request, using only one protocol, advantageously the protocol most likely to be requested, so as to optimize the storage capacities of the memory 29 of the packager 25.

Figure 5:
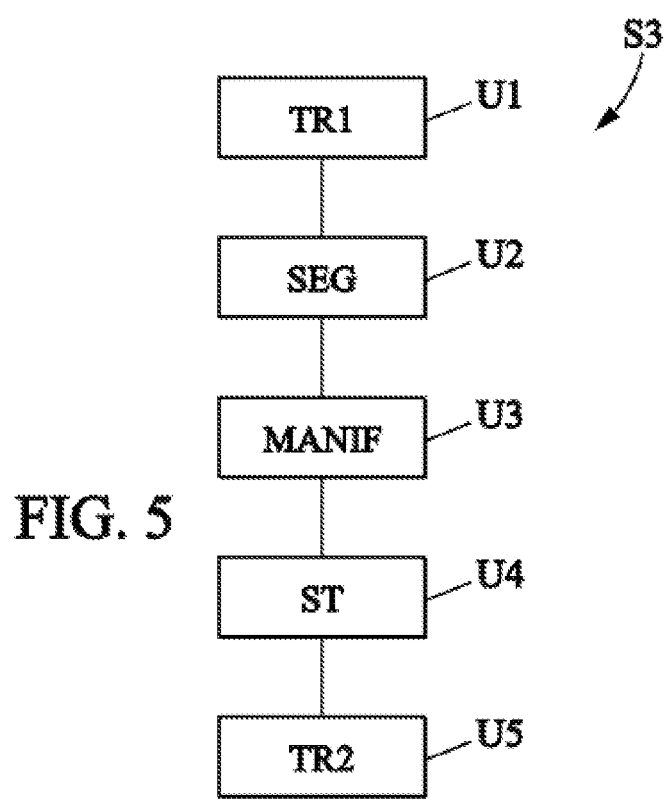
FIG. 5 illustrates the step of FIG. 4 according to a second embodiment of the invention.

Referring now to FIG. 5, the third step S3 will be described according to a second embodiment. This embodiment is implemented by the assembly 1 illustrated in FIG. 2. In this second embodiment, there is no transcoding. In other words, the digital processing is applied to streams previously encoded and not yet decoded.

In a first step U1, a first transformation TR1 is applied by the processing unit 21 to each encoded data stream. As previously explained, a respective processing unit 21 is associated with each of the data streams. The different data streams output from the processing unit 21 constitute the different profiles of each group of data streams. As explained above, the first transformation TR1 of this second embodiment is therefore applied to encoded data streams, therefore already compressed. The first transformation TR1 applied to already compressed data streams is more restrictive than the first transformation TR1 applied to uncompressed data streams: only a portion of the operations applicable to uncompressed data streams is applicable to compressed data streams.

In a second step U2, similar to step T4 of the first embodiment, the obtained profiles are respectively segmented into a plurality of segments. Each segment corresponds to a temporal fragment of the multimedia content. Typically, a segment corresponds to a few seconds of the multimedia content. As previously explained, segmentation of the profiles is implemented according to an HTTP Adaptive Streaming type of protocol. For example, the segmentation protocol for the plurality of segments is a MP4 or MPEG2-TS type of protocol. The same profile is segmented according to multiple protocols. It is understood here that several versions of the same profile are produced, each version being characterized by at least the segmentation protocol applied to the profile.

In a third step U3, similar to step T5 of the first embodiment, in parallel with or subsequent to step U2, the packager 25 generates a manifest comprising data representative of the segmented data streams, in other words of the profiles obtained. The manifest is intended to be made available and accessible to the receiving terminals.

In a fourth step U4, similar to step T6 of the first embodiment, the segmented profiles obtained are stored in the memory 29 of the packager 25.

In a fifth step U5, a second transformation TR2 is applied to at least one profile stored by the second processing unit 49, hereinafter processing unit 49. In one embodiment, the second transformation TR2 includes a filtering and/or a compression. This second transformation TR2 may be advantageous or necessary when, for example, the operating conditions of the metropolitan area network 9 do not allow, possibly temporarily, the distribution of a profile even if this profile was previously able to be generated and segmented. In such a case, the second transformation TR2 makes it possible to transform a profile into a version for which the conditions of the metropolitan area network 9 allow distribution. In this case, the manifest is updated accordingly.

In cases where the conditions of the metropolitan area network 9 have altered, a profile in the manifest may be filtered out. In other words, the segmented profile in question is not transformed but is no longer specified in the manifest, so that it can no longer be the object of a request. The updated manifest is then made available to the receiving terminals in place of the previous manifest. Thus, as long as the operating conditions of the metropolitan area network 9 do not allow distribution of a profile, a user cannot request the distribution of the profile in question, as said profile is not indicated in the manifest.

Steps U1, U2, U3, U4 and U5 of this second embodiment are here called "steps" but can also be considered as substeps of step S3. As explained above, the execution of steps U1, U2, U3, U4 and U5 is one embodiment of step S3. In the embodiment of the method described with reference to FIG. 5, the segmentation of profiles according to different protocols precedes the receiving of a request. However, the technologies referred to as Just in Time (JIT) make it possible to segment the profiles received by the packager 25 after receiving the request and based on the request. As a variant, a profile is segmented in advance of or upon receiving a first request, using only one protocol, advantageously the protocol most likely to be requested, so as to optimize the storage capacities of the memory 29 of the packager 25.

The example described below illustrates this second embodiment, in particular the step U5 of applying the second transformation TR2 and/or updating the manifest:

It is assumed that the first group GR1 of video data streams comprises a first $F_{11}$, a second $F_{12}$, and a third $F_{13}$ video data stream, thus defined after respectively applying the first transformation TR1 to each already-encoded data stream of the first group GR1 of video data streams (the third stream is not represented in the figures):

$F_{11}$: Ultra-High Definition (known by the acronym UHD) at 50 frames per second $F_{12}$: High definition (known by the acronym HD) at 50 frames per second $F_{13}$: Quad High Definition (known by the acronym QHD) at 25 frames per second The three already-encoded and then transformed data streams are therefore three different profiles. These profiles are then segmented according to different segmentation protocols.

If the accessibility, conditions, or state of the metropolitan area network 9 do not allow distribution, to the plurality of receiving terminals, of profiles at a definition higher than high definition and more than 25 frames per second, the processing unit 49 applies a second transformation to the first $F_{11}$ and second $F_{12}$ video profiles. The third video profile $F_{13}$ has properties compatible with the limits of the metropolitan area network 9 and therefore does not require application of the second transformation TR2.

For example, the first video profile $F_{11}$ is filtered out. This first video profile $F_{11}$ will therefore no longer be accessible to the plurality of receiving terminals. As a result and as previously explained, this profile will therefore also be filtered from the manifest. In other words, the data representative of this first video profile $F_{11}$ will be removed from the manifest. The manifest so updated is then made available to the receiving terminals in place of the previous manifest. Thus, the first video profile $F_{11}$ can no longer be the object of a request from one of the plurality of receiving terminals. However, in one embodiment, it is also possible to filter the first video profile $F_{11}$ from the manifest without deleting the first profile from the memory 29. The second video profile $F_{12}$ may also be filtered out. Nevertheless, in order to preserve variety in the available versions of the multimedia content and not modify the manifest too significantly, this second video profile $F_{12}$ may alternatively be compressed to reduce the frame rate to 25 frames per second. As a result, the data representative of the second video profile $F_{12}$ in the manifest are modified.

First and second embodiments of the invention have been presented in the description. These two embodiments are compatible and can be implemented in association. In other words, a mixed architecture combining functional units and equipment presented in the first embodiment illustrated in FIG. 1 and functional units and equipment presented in the second embodiment illustrated in FIG. 2 can be provided. Such a mixed architecture enables implementation of the method described with reference to FIG. 3, and in particular the implementation of step S3 according to the first embodiment illustrated in FIG. 4 when transcoding is possible, or according to the second embodiment illustrated in FIG. 5 when transcoding is not possible.

The invention offers several advantages.

Firstly, the physical location of the system 5 within the metropolitan area network 9, closer to the end user, makes it possible to reduce the load on the wide area network (upstream) since the latter carries a single audio-video stream F of multimedia content. This single audio-video stream serves as a reference, for the system 5, from which various versions of the same multimedia content are derived. In other words, some of the processing of the multimedia files is relocated downstream of the distribution platform, so that the amounts of data transmitted from the distribution platform to the end users are reduced.

In addition, the storage capacities of the distribution platforms, such as distribution platform 3, are less stressed. All other things being equal, the proposed system therefore makes it possible to support an increase in the number of client requests in comparison to existing systems.

Finally, content providers have more control in the distribution of multimedia content. The second embodiment of the system 5 makes it possible in particular to modify or delete profiles that do not meet the conditions of the metropolitan area network 9.

The invention claimed is:

1. A method implemented by computer means, in a metropolitan area network, for processing a multimedia content previously digitally encoded into an audio-video stream and transmitted from a distribution platform for the purposes of on-demand transmission to a plurality of receiving terminals, the method comprising the steps of:
    applying a demultiplexing function to the audio-video stream, said function being arranged to generate at least one group of data streams,
    decoding the data streams of the at least one group of data streams,
    applying a transformation to each decoded data stream of the at least one group of data streams,
    encoding each data stream of the at least one group of data streams, consecutively to the step of applying the transformation, the encoded data streams being profiles,
    segmenting each profile according to multiple segmentation protocols,
    storing the segmented profiles in a memory, the method further comprising, only in response to a request issued by a receiving terminal among the plurality of receiving terminals, steps of:
    selecting, on the basis of the request, at least one segmented profile of the stored segmented profiles,
    transmitting the at least one selected segmented profile to the receiving terminal that issued the request,
    wherein the at least one selected segmented profile is transmitted to the receiving terminal via a server of the metropolitan area network, the server being remote from the distribution platform and from the plurality of receiving terminals, and coupled to a memory suitable for temporarily storing the at least one transmitted segmented profile, the retention period for the at least one segmented profile stored in the memory being determined as a function of the segmentation protocol of the at least one segmented profile and depending on a probability that the at least one segmented profile will again be requested by another receiving terminal, wherein the retention period is an increasing function of the probability.

2. The method of claim 1, wherein the demultiplexing function is adapted to generate a first group of video data streams, a second group of audio data streams, and a third group of text and/or closed-caption data streams.

3. The method of claim 1, wherein a manifest containing data representative of the segmented profiles is produced in parallel with or subsequent to the step of segmenting the profiles.

4. The method of claim 3, wherein at least a portion of the manifest produced is transmitted to at least a portion of the plurality of receiving terminals.

5. The method of claim 1, further comprising the application of an additional transformation to at least one segmented profile.

6. The method of claim 5, wherein the additional transformation includes filtering and/or compressing the at least one segmented profile.

7. The method of claim 1, wherein, in response to a request subsequent to the first and issued by a second receiving terminal among the plurality of receiving terminals, at least one segmented profile stored in the memory is transmitted to said second receiving terminal.

8. A non-transitory computer-readable medium storing a code of a computer program, wherein said computer program comprises instructions for implementing the method of claim 1, when said instructions are executed by at least one processor.

9. A system for processing, in a metropolitan area network, a multimedia content previously digitally encoded into an audio-video stream and transmitted to the system from a distribution platform, for the purposes of on-demand transmission to a plurality of receiving terminals, the system comprising:

a demultiplexer arranged to apply a demultiplexing function to the audio-video stream received and to generate at least one group of data streams, a decoder arranged to decode the data streams of the at least one group of data streams output from the demultiplexer, a transformation processor arranged to apply a transformation to each data stream of the at least one group of data streams, an encoder adapted to encode each data stream of the at least one group of data streams output from the processing unit, the data streams output from the encoder being profiles, a packager arranged to segment each profile according to multiple segmentation protocols, a memory, coupled to the packager, adapted to store the profiles, a transceiver arranged to receive requests issued by receiving terminals, the packager being further arranged to:

select, only upon receipt by the transceiver of a request issued by a receiving terminal among the plurality of receiving terminals, on the basis of the request, at least one segmented profile from the stored segmented profiles, transmit the at least one selected segmented profile to the receiving terminal that issued the request, wherein the at least one selected segmented profile is transmitted to the receiving terminal via a server of the metropolitan area network, the server being remote from the distribution platform and from the plurality of receiving terminals, and coupled to a memory suitable for temporarily storing the at least one transmitted segmented profile, the retention period for the at least one segmented profile stored in the memory being determined as a function of the segmentation protocol of the at least one segmented profile and depending on a probability that the at least one segmented profile will again be requested by another receiving terminal, wherein the retention period is an increasing function of the probability.

10. The system of claim 9, wherein the distribution platform forms a gateway between a wide area network and the metropolitan area network.

11. The system of claim 9, wherein the processing unit or an additional processing unit of the system is arranged to apply an additional transformation to at least one segmented profile.

12. The system of claim 11, wherein the processing unit or the additional processing unit is adapted to filter and/or compress the at least one segmented profile.

* * * * *